(12) United States Patent
Ma et al.

(10) Patent No.: US 10,270,126 B2
(45) Date of Patent: Apr. 23, 2019

(54) SOLID-STATE ELECTROLYTES FOR LITHIUM BATTERIES AND PROCESS FOR PRODUCTION THEREOF

(71) Applicant: Forschungszentrum Juelich GmbH, Juelich (DE)

(72) Inventors: Qianli Ma, Juelich (DE); Frank Tietz, Monschau (DE); Olivier Guillon, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 38 days.

(21) Appl. No.: 15/508,494

(22) PCT Filed: Aug. 19, 2015

(86) PCT No.: PCT/DE2015/000414
§ 371 (c)(1),
(2) Date: Mar. 3, 2017

(87) PCT Pub. No.: WO2016/034158
PCT Pub. Date: Mar. 10, 2016

(65) Prior Publication Data
US 2017/0288263 A1    Oct. 5, 2017

(30) Foreign Application Priority Data
Sep. 5, 2014 (DE) .................. 10 2014 012 926

(51) Int. Cl.
H01M 10/05 (2010.01)
C01B 25/45 (2006.01)
(Continued)

(52) U.S. Cl.
CPC ......... H01M 10/0562 (2013.01); C01B 25/45 (2013.01); H01M 10/052 (2013.01);
(Continued)

(58) Field of Classification Search
None
See application file for complete search history.

(56) References Cited

U.S. PATENT DOCUMENTS 6,475,677 B1    11/2002   Inda et al.
9,748,557 B2 *   8/2017   Holzapfel ............... C01B 25/45
(Continued)

FOREIGN PATENT DOCUMENTS

CN    103466588 A    12/2013
CN    103825052 A     5/2014
(Continued)

OTHER PUBLICATIONS

DE 10-2012-103409 machine English translation (Year: 2012).*
(Continued)

Primary Examiner — Scott J. Chmielecki
(74) Attorney, Agent, or Firm — Leydig, Voit & Mayer, Ltd.

(57) ABSTRACT

A method for preparing a lithium titanium phosphate, wherein a sol-gel process is used to prepare the phosphate, includes producing a sol from source materials; converting the sol to a gel; and drying the gel to obtain a corresponding powder comprising the lithium titanium phosphate. In a substep, the method further includes adding titanium(IV) isopropoxide to water to produce precipitates of titanium hydroxide oxide, cooling a system down to a temperature of less than 10° C., and redissolving the precipitates by adding nitric acid to form an aqueous $TiO^{2+}$ nitrate solution. The lithium titanium phosphate has a general composition $Li_{1+x+y}M_xTi_{2-x}(PO_4)_{3-y}(SiO_4)_y$, wherein M=Al, Ga, In, Sc, V, Cr, Mn, Co, Fe, Y, La—Lu, wherein $0 \leq x \leq 0.5$, and wherein $0 \leq y \leq 0.5$.

14 Claims, 3 Drawing Sheets

(51) Int. Cl.
*H01M 10/0562* (2010.01)
*H01M 10/052* (2010.01)
*H01M 10/0525* (2010.01)
*H01M 12/08* (2006.01)

(52) U.S. Cl.
CPC ....... *H01M 10/0525* (2013.01); *H01M 12/08* (2013.01); *C01P 2006/40* (2013.01); *H01M 2300/0065* (2013.01); *H01M 2300/0068* (2013.01)

(56) References Cited

U.S. PATENT DOCUMENTS

| | | | |
|---|---|---|---|
| 2012/0288740 A1* | 11/2012 | Byun | H01M 2/021 |
| | | | 429/96 |
| 2012/0295168 A1 | 11/2012 | Holzapfel et al. | |
| 2014/0166930 A1 | 6/2014 | Hamamoto et al. | |
| 2015/0064514 A1* | 3/2015 | Wu | H01M 10/658 |
| | | | 429/56 |
| 2015/0236339 A1* | 8/2015 | Holzapfel | H01M 4/136 |
| | | | 252/182.1 |
| 2016/0254504 A1* | 9/2016 | Kim | H01M 2/1061 |
| | | | 429/99 |
| 2017/0075182 A1* | 3/2017 | Nguyen | G02F 1/1347 |

FOREIGN PATENT DOCUMENTS

| | | | | |
|---|---|---|---|---|
| DE | 60000488 T2 | | 8/2003 | |
| DE | 102012103409 B3 * | | 11/2012 | ............. C01B 25/45 |
| DE | 102012103409 B3 | | 11/2012 | |
| WO | WO-2013156116 A1 * | | 10/2013 | ............. C01B 25/45 |

OTHER PUBLICATIONS

Kotobuki Masashi et al: "Preparation of Li1.5A10.5Ti1.5 (P04)3 solid electrolyte via a sol-gel route using various Al sou", Ceramics International, Elsevier, Amsterdam, NL, vol. 39, No. 4, Oct. 22, 2012 (Oct. 22, 2012), pp. 4645-4649, XP028983633.

Zhaoyin Wen, et al., "Preparation, microstructure and electrical properties of $Li_{1.4}Al_{0.4}Ti_{1.6}(PO_4)_3$ nanoceramics", J Electroceram (2009), vol. 22, pp. 342-345, Dec. 2009).

Hiromichi Aono, et al., "Ionic Conductivity of Solid Electrolytes Based on Lithium Titanium Phosphate", J. Electrochem. Soc., vol. 137, No. 4, Apr. 2, 1990, pp. 1023-1027.

* cited by examiner

US 10,270,126 B2

SOLID-STATE ELECTROLYTES FOR LITHIUM BATTERIES AND PROCESS FOR PRODUCTION THEREOF

CROSS REFERENCE TO RELATED APPLICATIONS

This application is a U.S. National Phase application under 35 U.S.C. § 371 of International Application No. PCT/DE2015/000414 filed on Aug. 19, 2015, and claims benefit to German Patent Application No. DE 10 2014 012 926.8, filed Sep. 5, 2014. The international application was published in German on Mar. 10, 2016, as WO 2016/034158 A1 under PCT Article 21(2).

FIELD

The invention relates to a process for preparing pure lithium titanium phosphates ($LiTi_2(PO_4)_3$, LTP for short) and substituted lithium titanium phosphates for use as solid-state electrolytes for lithium batteries.

BACKGROUND

Large, powerful and safe lithium-based energy storage devices represent an essential component in developing alternative drive concepts, e.g. for hybrid vehicles or renewable energy techniques, e.g. for storing the electricity produced by wind power. Lithium ion batteries, or LIB, are now the most widely used power sources for mobile applications. The electrolyte between the electrodes comprises dissolved lithium salt. We refer to lithium ion accumulators, lithium polymer accumulators, or lithium solid-state accumulators according to whether the electrolyte is liquid or solid.

In this context, the development of solid-state electrolytes may be the key to the next generation of lithium batteries. When using metallic lithium as an anode, they have a considerably higher energy density and are advantageously less flammable, since it is no longer necessary to use organic components in the battery components. Due to their usually gel-type or ceramic electrolytes, they also have better flow properties and can be used at higher temperatures due to their wide stability range.

Substituted lithium titanium phosphates have already been extensively researched as potential candidates for a solid-state electrolyte conducting lithium ions and assessed as being very promising due to their high ion conductivity and mechanical stability.

Lithium titanium phosphates' potential as an electrolyte has been known for quite some time. Lithium titanium phosphate crystallizes in the so-called NASICON structure. NASICON stands for "Sodium (NA) Super Ionic CONductor", and refers to a group of solids having the chemical formula $Na_{1+x}Zr_2Si_xP_{3-x}O_{12}$ where $0<x<3$.

NASICON is also used to refer to similar compounds in which Na, Zr and/or Si can be replaced by isovalent elements and crystallize in the same structure.

NASICON compounds are generally characterized by high ionic conductivity ranging from $10^{-5}$ to $10^{-3}$ S/cm at room temperature. At higher temperatures of 100-300° C., ionic conductivity increases to $10^{-2}$-$10^{-1}$ S/cm and is thus comparable with liquid electrolytes. This high conductivity is caused by the mobility of the Na or Li ions within the NASICON crystal lattice.

The crystal structure of NASICON compounds consists of a covalent network of $ZrO_6$ octahedrons and $PO_4/SiO_4$ tetrahedrons joined via shared edges. The Na or Li ions are located on two different interstices, between which they are able to move. In this process they have to pass through so-called bottlenecks. The size of the bottlenecks influences ionic conductivity due to steric interaction of the Na ions with the local environment of the $Zr_2(P,Si)_3O_{12}$ lattice and is dependent on the specific composition of the NASICON compound and the acid content of the surrounding atmosphere. Ionic conductivity can be increased by adding a rare earth element such as yttrium, for example, to the NASICON compound.

Partial substitution of $Ti^{4+}$ cations by a trivalent $M^{3+}$ cation such as $Al^{3+}$, $Y^{3+}$ or $Sc^{3+}$ may cause a defect in the positive charge in the crystal structure of lithium titanium phosphates, which can be compensated by additional $Li^+$ ions, leading to higher ionic conductivity overall as the number of charge carriers is increased as a result.

The ionic conductivity figures for substituted LTP materials published in literature to date are typically in the region of $1\times10^{-4}$ to $1\times10^{-3}$ S/cm, and are thus the highest values known for solid oxide electrolytes in literature, alongside garnets of the $Li_7La_2Zr_3O_{12}$ type which conduct Li ions. It was assumed that a further substitution of phosphate groups by silicate groups according to the general formula $Li_{1+x+y}M_xTi_{2-x}(PO_4)_{3-y}(SiO_4)_y$ would increase ionic conductivity and mechanical stability still further (U.S. Pat. No. 6,475,677 B1).

A number of different processes for preparing LTP-based powders are already known in the art. These include the solid phase reaction, the sol-gel method, and the melt-quenching technique (melting followed by quenching).

However, one of the major challenges when preparing LTP-based materials is ensuring phase purity of the prepared powders. In the traditional process using a solid phase reaction, the prepared powders generally contain internal impurities. These disadvantageously lead to a reduction in the ionic conductivity of these powders.

A further problem when preparing LTP-based materials is the compaction required for many applications, as the temperature required during compaction is usually very close to the decomposition temperature of these materials. To date, the only methods capable of resolving the above-mentioned problems have been expensive and complex.

U.S. Pat. No. 6,475,677 B1 describes the method used in the melt-quenching process by way of example. In this case the source material (stoichiometric quantities of $NH_4H_2PO_4$, $Al(PO_3)_3$, $LiCO_3$, $SiO_2$ and $TiO_2$) is initially melted at approximately 1500° C. and then cooled in a water bath so that it recrystallizes at 950° C. to prepare $Li_{1+x+y}M_xTi_{2-x}(PO_4)_{3-y}(SiO_4)_y$, where $0\le x\le 0.4$ and $0\le y\le 0.6$. The resulting glass ceramic was milled in a ball mill until average particle sizes of 7 µm were obtained.

Wen et al, "Preparation, Microstructure and Electrical Properties of $Li_{1.4}Al_{0.4}Ti_{1.6}(PO_4)_3$ Nanoceramics," J. Electroceram, Volume 22, 2009, Pages 342-345, report that almost 100% of the theoretical density is achieved by compacting prepared $Li_{1.4}Al_{0.4}Ti_{1.6}(PO_4)_3$ powder using a sol-gel method by spark laser sintering. This led to an Li ion conductivity of $1.39\times10^{-3}$ S/cm at room temperature. However, the laser device used for this purpose seems to be unsuitable for industrial production.

M. Holzapfel et al (US 2012/0295168 A1) describe a spray drying method by means of which $Li_{1+x}Al_xTi_{2-x}(PO_4)_3$ where $x\le 0.4$ was prepared as "phase-pure" powder in the first instance. In this process, corresponding quantities of lithium, aluminum and titanium salts or corresponding oxides were first dissolved in phosphoric acid. The primary powders were then obtained by spray drying the solution.

The "phase-pure" $Li_{1+x}Al_xTi_{2-x}(PO_4)_3$ powder could then be prepared by sintering the primary powders at approximately 900° C. "Phase-pure" is understood to mean that foreign phases, such as $AlPO_4$ or $TiP_2O_7$ are present in quantities of less than 1% of the total. The document does not disclose tests on the density of the $Li_{1+x}Al_xTi_{2-x}(PO_4)_3$ green bodies. There is also the question of the hazards posed by spray drying phosphoric acid-based solutions.

DE 10 2012 103 409 B3 also describes another method for preparing $Li_{1+x+y}Al_xTi_{2-x}P_{3-y}Si_yO_{12}$ powder where $x≤0.4$. This document discloses a sol-gel method for preparation purposes. Aqueous lithium and aluminum salt solutions are mixed with a titanium alkoxide and, if applicable, an orthosilicate in corresponding proportions to form a sol. The aqueous solutions have a pH value in the neutral to alkaline range from 7 to 12. An aqueous ammonium dihydrogen phosphate solution is then added to the sol, causing a gel to form. The gel is formed as a result of a condensation and polymerization reaction initiated by combining the alkoxide and phosphate solutions without the need for additional auxiliary substances such as glycol or citric acid.

The final pure powder is then obtained by drying and calcining the gel. The resulting average particle sizes range from 0.5 µm to 5 µm. All process steps prior to calcining take place at room temperature. The heat treatment should ensure pyrolytic decomposition of disruptive elements which evaporate off.

However, DE 10 2012 103 409 B3 explains that impurities in the $Li_{1+x+y}Al_xTi_{2-x}P_{3-y}Si_yO_{12}$ powder cannot be completely ruled out in the synthesis method thus described. It reports that, despite the foreign phases that occur, a lithium ion conductivity in the region of $1×10^{-3}$ S/cm would still be achieved at room temperature. Furthermore, a dense sintered product would be obtained by sintering at a pressure of between 5 and 50 MPa.

SUMMARY

In an embodiment, the present invention provides a method for preparing a lithium titanium phosphate, wherein a sol-gel process is used to prepare the phosphate. The method includes producing a sol from source materials; converting the sol to a gel; and drying the gel to obtain a corresponding powder comprising the lithium titanium phosphate. In a substep, the method includes adding titanium(IV) isopropoxide to water to produce precipitates of titanium hydroxide oxide, cooling a system of the precipitates down to a temperature of less than 10° C., and redissolving the precipitates by adding nitric acid to form an aqueous $TiO^{2+}$ nitrate solution. The lithium titanium phosphate has a general composition $Li_{1+x+y}M_xTi_{2-x}(PO_4)_{3-y}(SiO_4)_y$, wherein M=Al, Ga, In, Sc, V, Cr, Mn, Co, Fe, Y, La—Lu, wherein $0≤x≤0.5$, and wherein $0≤y≤0.5$.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
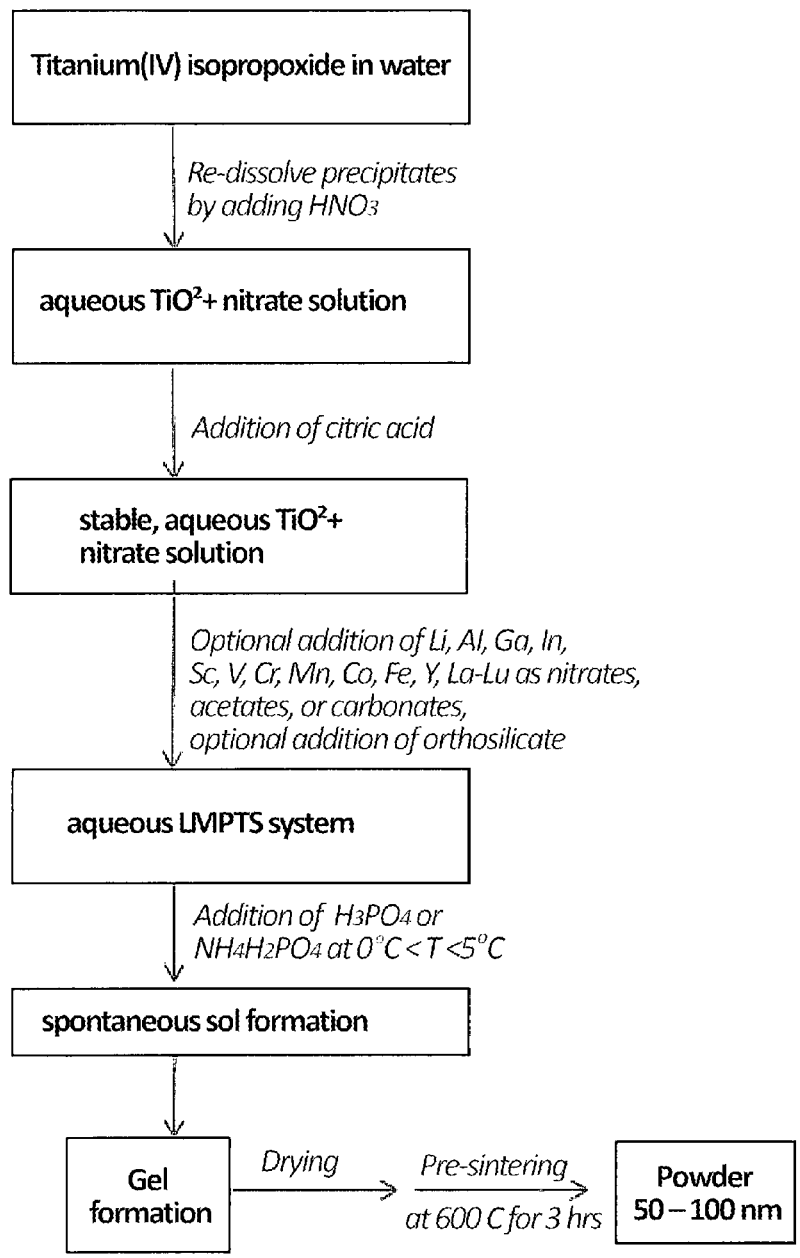
FIG. 1: Diagram showing the LMTPS powder production process according to the invention, which can also be used in the same way for pure LPT powder.

A single-phase material based on lithium titanium phosphates (LTP) in a NASICON structure and a method for providing the same are described herein, the single-phase material displaying a high lithium ion conductivity in excess of $10^{-4}$ S/cm at room temperature and being suitable for use as a solid-state electrolyte for lithium batteries. This material may be a pure or substituted lithium titanium phosphate, especially one having the general formula $Li_{1+x+y}M_xTi_{2-x}(PO_4)_{3-y}(SiO_4)_y$ where M=Al, Ga, In, Sc, V, Cr, Mn, Co, Fe, Y, La—Lu, where $0≤x≤0.5$ and $0≤y≤0.5$. The material can also be compacted to more than 95% of the theoretical density in a simple and less complex compaction step.

An economical and effective process for preparing a pure or substituted lithium titanium phosphate is described herein.

A production process for preparing a material based on lithium titanium phosphates, which can be performed simply and economically on a large industrial scale is described herein, the material based on lithium titanium phosphates having a high level of phase purity and being easy to sinter or compact to more than 95% of the theoretical density. The material based on lithium titanium phosphates prepared in this manner is particularly suited for use as a solid-state electrolyte in a lithium battery, an Li/air battery, or a lithium ion accumulator due to its high lithium ion conductivity.

In a process according to an embodiment of the invention, the material has the following composition: $Li_{1+x+y}M_xTi_{2-x}(PO_4)_{3-y}(SiO_4)_y$ where M=Al, Ga, In, Sc, V, Cr, Mn, Co, Fe, Y, La—Lu where $0≤x≤0.5$ and $0≤y≤0.5$.

An embodiment of present invention discloses a simple, economical, and easy-to-monitor method (synthesis) for preparing single-phase and readily sinterable material based on lithium titanium phosphates. In addition to pure, unsubstituted lithium titanium phosphate ($LiTi_2(PO_4)_3$), this also covers compounds in which the titanium is at least partially replaced by transition metals such as Al, Ga, In, Sc, V, Cr, Mn, Co, Fe, Y, La—Lu. The term La—Lu refers to elements with atomic numbers 57 to 71. It also covers those compounds in which the phosphate has been partially replaced by silicate. The above-mentioned substitutions may be made on an alternative or cumulative basis.

The material according to an embodiment of the invention has the advantageous property that it can be compacted simply and without pressure-assisted sintering to form a high-density component.

The process according to an embodiment of the invention is based on a known sol-gel process in which a sol is first prepared from lithium, titanium and, if applicable, other ions in an aqueous solution, said sol being converted to a gel by adding phosphate ions.

A sol is a special instance of a colloid. Colloids are understood to mean particles or droplets that are finely distributed in a solid, liquid or gaseous dispersion medium. The size of the individual particles or droplets is typically expressed in terms of nanometers or micrometers. A sol is understood to mean a single-phase system in which an initial component forms a sponge-like, three-dimensional network, the pores of which are filled with another component, particularly a solvent. A sol can be converted to a gel by condensation and may in turn be reverted to a sol by hydrolysis.

A sol can be understood to mean a polymer solution that can be converted to a viscoelastic solid (gel) as part of a continuous phase transformation. A gel contains a three-dimensional network comprising a first component, which forms a three-dimensional network when synthesized in a solvent incorporating said gel or in which an existing network swells up by incorporating a solvent. A gel can be characterized by the fact that the network retains its external form and has resilient properties.

The powder prepared according to an embodiment of the invention has a composition having the following general formula $Li_{1+x+y}M_xTi_{2-x}(PO_4)_{3-y}(SiO_4)_y$ where M=Al, Ga, In, Sc, V, Cr, Mn, Co, Fe, Y, La—Lu, and where $0 \leq x \leq 0.5$ and $0 \leq y \leq 0.5$.

A compound based on lithium titanium phosphate (LTP), in which the lithium is partially substituted by M, is also abbreviated below as LMTP.

A compound based on lithium titanium phosphate (LTP), in which the phosphate is partially substituted by silicate, is also abbreviated below as LTPS.

A compound based on LTP, in which both the lithium is partially substituted by M and the phosphate is also partially substituted by silicate, is also abbreviated below as LMTPS.

According to an embodiment of the invention, economical source materials can be used in the process to prepare LTP, LMTP, LTPS, or LMTPS powder, and the process itself can be performed using simple laboratory apparatus. The process can also readily be upscaled from laboratory scale with a yield of 10 g to 1000 g, for example, to a yield of several tonnes for industrial applications.

An acidic aqueous solution is provided as a source material according to an embodiment of the invention. According to an embodiment of the invention, a stable $TiO^{2+}$ nitrate solution is provided as a first step in the process.

Since $TiO^{2+}$ is known to preferably form long $(TiO)_n^{2n+}$ chains and complex titanium hydroxide oxides are precipitated even under extremely acidic conditions, it is not easy to produce a relatively stable solution.

An embodiment of the present invention solves this problem by producing a stable $TiO^{2+}$ solution in a first significant process step. To this end, titanium(IV) isopropoxide is added to a sufficient quantity of distilled water. This immediately results in the precipitation of titanium hydroxide oxide ($TiO_2 \cdot nH_2O$) in isopropanol.

The fresh precipitates can easily be re-dissolved with nitric acid. Precipitates are described as fresh if they have only been exposed to air for a short period, in other words for just a few hours.

It may only be possible to re-dissolve the titanium hydroxide oxide precipitates for a short period of time at room temperature. Titanium hydroxide oxide precipitates may form again very soon thereafter and may no longer be dissolved by the existing nitric acid. Both the precipitates that have been re-dissolved and newly precipitated precipitates can no longer be dissolved, and new (fresh) precipitates can no longer be dissolved as a general rule after a certain time, as explained in the previous section.

The precipitation process takes place continuously, which means that it is difficult, even for a person skilled in the art, to predict exactly when the solution will form a sol.

In an embodiment of the present invention, the fresh titanium hydroxide oxide precipitates are dissolved in nitric acid at low temperatures of between 0 and 10° C., preferably between 0 and 8° C. In this case the pH value is in the range from 0 to 1. In this case, the titanium hydroxide oxide precipitation transformation process can be extended to a period of up to 20 days from the standard 10 days.

A polycarboxylic acid such as citric acid is added during this period, i.e. as long as the $TiO^{2+}$ nitrate solution is present. A stable aqueous system is then formed in this state, said system being able to be stored at room temperature for a longer period of time, i.e. even longer than 20 days, without undergoing any further changes. Adding twice as many moles of citric acid as of $TiO^{2+}$ is quite sufficient to achieve the above-mentioned effect. In addition to citric acid, other polycarboxylic acids having at least two carboxylic acids, such as oxalic acid, fumaric acid or even tartaric acid, for example, are also suitable.

On the basis of this stable $TiO^{2+}$ nitrate solution according to an embodiment of the invention, corresponding quantities of salts can then be added to achieve the required stoichiometry of lithium and M, according to whether pure or substituted lithium titanium phosphate is to be obtained.

Lithium and the transition metals, M, may, for example, be added to the aqueous system in the form of nitrates, acetates or carbonates. In addition, suitable oxides of Li or M can also be dissolved in nitric acid beforehand. In principle, any soluble salts or any acid of the required elements (Li, Al, Ga, In, Sc, V, Cr, Mn, Co, Fe, Y, La—Lu) can be used provided that they can be broken down by a subsequent calcining process without leaving behind any impurities in the aqueous system.

As a rule, phosphoric acid and/or ammonium dihydrogen phosphate are added to form phosphate groups.

Adding citric acid before adding phosphoric acid and/or ammonium dihydrogen phosphate can be advantageous if the freshly formed $TiO^{2+}$ nitrate solution is to be processed again immediately. Otherwise, if citric acid is not added, spontaneous precipitation would occur in the $TiO^{2+}$ nitrate solution. In addition, larger particles would form in the sol, and said particles would subsequently no longer have the required properties.

By way of example, adding soluble silicates or orthosilicic acids or alkyl esters of orthosilicic acid in corresponding quantities is a possible option to ensure partial substitution of the phosphate groups. However, these are always added before adding phosphoric acid and/or ammonium dihydrogen phosphate.

A particular advantage of this process according to an embodiment of the invention is that it offers multiple applications with suitable source materials. For example, U.S. Pat. No. 6,475,677 B1 explicitly mentions $NH_4H_2PO_4$, $Al(PO_3)_3$, $LiCO_3$, $SiO_2$ and $TiO_2$ as source materials. U.S. 20120295168 A1 stipulates the use of $TiO_2$ in the anatase modification, LiOH, $Al(OH)_3$ and orthophosphoric acid.

All soluble salts or acids of elements Li, Al, Ga, In, Sc, V, Cr, Mn, Co, Fe, Y and La—Lu in the form of nitrates, acetates, carbonates or even hydroxides or the like, for example, may advantageously be used in the present invention once the $TiO^{2+}$ solution has been prepared. Orthosilicic acids, tetraethyl ester orthosilicate (TEOS) or other organic silicon sources and $NH_4H_2PO_4$, $(NH_4)_2HPO_4$ or even $H_3PO_4$ can also be used.

The compounds used should be soluble and should only have the corresponding composition, i.e. no impurities if at all possible, as a general rule.

Note that phosphoric acid or ammonium dihydrogen phosphate should be added last to the aqueous system comprising the $TiO^{2+}$, salts (ions) of lithium and M, and optionally the silicate or orthosilicic acid and/or alkyl esters of orthosilicic acid.

The phosphoric acid or ammonium dihydrogen phosphate is added at low temperatures of between 0 and 10° C., or advantageously between 0 and 5° C. Due to the dissolved salts, ice would not form even at 0° C. As the titanium phosphate that may potentially form generally displays a strong tendency to precipitate, by observing the above-mentioned low temperatures, this tendency to precipitate can be advantageously avoided, or at least restricted to a considerable extent.

As soon as the phosphoric acid or ammonium dihydrogen phosphate is added to the aqueous system and mixed with said system, a homogeneous sol is formed immediately. This process usually takes place within a few seconds, for example within 2 seconds.

The pure or substituted LTP components are mixed in the solution on the nanometer scale, which has a positive effect on phase purity of the powder to be produced. Furthermore, the low temperature generally prevents the growth of particles within the sol. On the other hand, small particle sizes in the sol also lead to small particle sizes during powder preparation, which is in turn advantageous for any subsequent sintering process.

The sol formed in the above-mentioned manner is not usually stable in the long-term. After a certain time, the sol is transformed continuously into a homogeneous gel. The transformation process takes place within a matter of minutes, depending on the temperature, for example over a period ranging from 30 minutes to up to one hour. At room temperature, it is transformed into a gel more quickly, in a matter of minutes, but correspondingly slower at low temperatures of around 0° C., i.e. up to one hour.

DE 102012103409 B3 also describes a gel that forms spontaneously, said gel being obtained as soon as an ammonium dihydrogen phosphate solution ($NH_4H_2PO_4$) is added to the aqueous mixture of aluminum nitrate ($Al(NO_3)_3$), lithium acetate ($LiCH_3OO$) and titanium(IV) isopropoxide ($Ti(OCH_2)CH_3)_4$. However, it is assumed that the aqueous mixture of aluminum nitrate ($Al(NO_3)_3$, lithium acetate ($LiCH_3OO$) and titanium(IV) isopropoxide ($Ti(OCH_2)CH_3)_2)_4$ is not a sol as defined in this invention, as this process step of the subsequent gel formation process has not been able to be reproduced to date.

The lack of phase purity described in DE 102012103409 B3 suggests that the aqueous mixture of source materials is not present either as a pure solution or as a sol, but presumably already contains precipitates of larger particles. This would also explain why a pressure-assisted sintering process is required to compact the resulting powder, as this is usually only required if larger particles are present.

Whereas according to embodiments of the invention, the pure or substituted lithium titanium phosphate powder is advantageously compacted at room temperature (e.g. with a pressure of 100 MPa) and then sintered without any pressure being applied, in DE 102012103409 B3 the powder is compacted at temperatures of around 900° C. and then sintered. However, disadvantageously complex equipment is required to compact at high temperatures.

According to embodiments the invention, the resulting homogeneous gel is then dried for several hours before it is pre-sintered. For example, the homogeneous gel may first be pre-dried for several hours at lower temperatures of less than 100° C. and then fully dried for additional hours at temperatures in excess of 100° C.

A pre-sintering step is then performed at temperatures of around 600° C., during which the required pure or substituted lithium titanium phosphate powder is obtained.

At temperatures of approximately 600° C., it can be assumed that the majority of organic components will have evaporated from the pre-dried gel. Within the scope of the invention, the dried gel is understood to mean the powder with quantities of organic components and amorphous, inorganic components.

However, the resulting powder is generally not yet phase-pure. In addition, larger agglomerations may also be observed in some cases. For this reason, a milling process, using a ball mill and ceramic balls, for example, is proposed before the actual sintering process to compact the material in order to break up any existing agglomerations, evaporate off any remaining residues of organic components and guarantee that the pre-sintered powder is also sinterable.

The pre-sintered powder is whitish grey in color and has a particle size of between 50 and 100 nm after the milling step. In this case, the particle size relates to non-agglomerated powder.

Embodiments of the invention then propose a simple compaction step for the pre-sintered and, if applicable, milled powder. To this end, the powder is first advantageously compacted at room temperature and then sintered for several hours at high temperatures. A uniaxial press is particularly suited to pressing the powder. Pressures of between 50 and 200 MPa have been shown to be suitable contact pressures, especially pressures around 100 MPa.

The next sintering step can then take place at temperatures of between 820 and 1050° C., advantageously between 870 and 920° C. Sintering should last for several hours, advantageously for a period of at least five hours. The above-mentioned periods include the holding time at the maximum set temperature and thus do not include the required heating-up and cooling-down phases. Typical figures ranging from 3 to 15 K/min can be specified as heating-up and cooling-down rates. Pressure will not be applied during sintering as a general rule.

Examination of the sintered powder or the compacted pellets by means of x-ray diffraction (XRD) revealed that foreign phases could not be detected in the specimens of pure or substituted lithium titanium phosphate material prepared according to the invention. The powder diffractogram did not show any foreign phase reflexes such as $AlPO_4$ or $TiP_2O_7$, as mentioned in DE 10 2012 103 409 B3.

The density of the specimens prepared according to the invention was in excess of 99% of the theoretical density. Such a process, by means of which LTP, LMTP, LTPS or LMTPS materials having such a high density can be prepared by means of simple compaction and sintering steps, is not known in the art to date.

These high densities of the materials prepared according to embodiments of the invention lead to very good lithium ion conductivity ranging from $1 \times 10^{-4}$ to $1 \times 10^{-3}$ S/cm. The sintered pure or substituted lithium titanium phosphate material can thus be used advantageously and directly as a solid-state electrolyte in a lithium battery.

Figure 4:
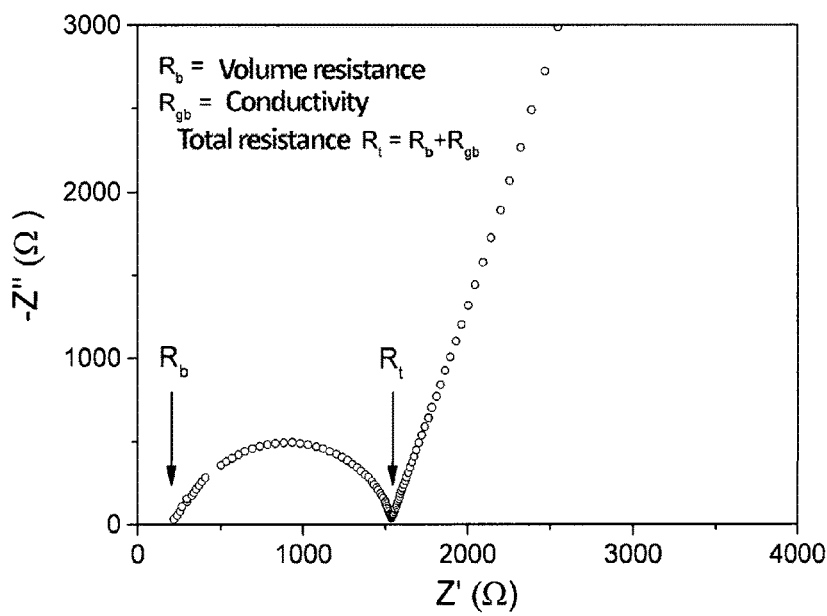
FIG. 4: Impedance spectrum after measuring the $Li_{1.5}Al_{0.5}Ti_{1.5}(PO_4)_3$ compacted product prepared according to the invention at 20° C.

Ion conductivity was calculated by electrochemical impedance spectroscopy on the corresponding pellets. The results are shown in FIG. 4.

In addition to the above-mentioned compaction step, dense, LTP-based components can be prepared from the pre-sintered powder or directly by means of tape casting or dense, LTP-based layers can be applied to other substrates by screen printing.

In summary, it is possible to say that embodiments of the present invention provide a single-phase and readily sinterable material based on lithium titanium phosphates, which has the composition $Li_{1+x+y}M_xTi_{2-x}(PO_4)_{3-y}(SiO_4)_y$ where M=Al, Ga, In, Sc, V, Cr, Mn, Co, Fe, Y, La—Lu where $0 \leq x \leq 0.5$ and $0 \leq y \leq 0.5$, and displays very good lithium ion conductivity ranging from $1 \times 10^{-4}$ to $1 \times 10^{-3}$ S/cm at room temperature. To this end, the invention discloses a simple and economical production process for these pure or substituted lithium titanium phosphate materials, which can preferably be used as solid-state electrolytes.

Preferred compositions for the material prepared according to embodiments of the invention comprising $Li_{1+x+y}M_xTi_{2-x}(PO_4)_{3-y}(SiO_4)_y$ where M=Al, Ga, In, Sc, V, Cr, Mn, Co, Fe, Y, La—Lu where $0 \leq x \leq 0.5$ and $0 \leq y \leq 0.5$, include, but are not restricted to: $Li_{1.5}Al_{0.5}Ti_{1.5}(PO_4)_3$, $Li_{1.4}Y_{0.4}Ti_{1.6}(PO_4)_3$, $Li_{1.3}La_{0.3}Ti_{1.7}(PO_4)_3$, $Li_2Sc_{0.5}Ti_{1.5}(PO_4)_{2.5}(SiO_4)_{0.5}$ or $Li_{1.8}Al_{0.4}Ti_{1.6}(PO_4)_{2.6}(SiO_4)_{0.4}$.

It is assumed that a person skilled in the art will also consider other compounds having the general formula $LiM_2(PO_4)_3$ and an ordered NASICON structure to be covered within the scope of the invention.

The scale of the production processes described below is very dependent on the machinery used for the drying and sintering steps. On a laboratory scale, where laboratory ovens and sintering ovens are usually available, production quantities of several kilograms are usually possible. On a large industrial scale, however, LMTPS powder can also easily be produced in quantities of several tonnes.

Embodiment 1: Preparing 1 Kg of $Li_{1.5}Al_{0.5}Ti_{1.5}(PO_4)_3$ Powder

The chemicals used had a purity level of at least 99%. In order to produce $Li_{1.5}Al_{0.5}Ti_{1.5}(PO_4)_3$ powder, 1120 g titanium isopropoxide $[Ti(IV)(OCH_2(CH_3)_2)_4]$ was first added slowly to a beaker containing 7 liters of deionized water while stirring. Titanium hydroxide oxide precipitates formed instantaneously. The precipitates were carefully filtered and washed. The washed precipitate was transferred to an empty beaker and topped up with 3 liters of deionized water. The beaker containing the aqueous precipitate solution was cooled in an ice bath comprising a mixture of ice and water and sodium chloride, if applicable, to temperatures of less than 5° C., stirring constantly.

670 ml nitric acid (65% by weight) was also cooled to temperatures of less than 5° C. in another beaker. Cooling took place in a refrigerator. The cooled nitric acid was slowly added to the existing cooled solution containing the titanium hydroxide oxide precipitates. The heat that is generally produced during this reaction was dissipated via the ice bath. The speed at which the nitric acid was added was gauged such that the temperature of the solution containing the titanium hydroxide oxide precipitates did not exceed 10° C. The resulting aqueous system was stored in a refrigerator at 0° C. for three days. The aqueous $TiO^{2+}$ nitrate solution formed during this period. The solution could be stabilized by adding 1720 g citric acid monohydrate.

271.7 g lithium nitrate ($LiNO_3$) and 492.7 g aluminum nitrate ($Al(NO_3)_3 \cdot 9 H_2O$) were weighed out and added to the titanium solution while stirring. The resulting solution was cooled again to temperatures of less than 5° C. in an ice bath. In addition, 906.6 g of ammonium dihydrogen phosphate ($NH_4H_2PO_4$) was then added while stirring, causing a sol to form spontaneously. The mixture was stirred for a further 30 minutes. The sol was then slowly heated to room temperature. After approximately 1 hour, the process of continuous transformation to a gel was complete.

The resulting gel was initially pre-dried for 12 hours at 60° C. and then for a further 24 hours at 120° C. The dried gel was pre-sintered for 3 hours at 600° C. This resulted in a whitish grey powder. The powder was milled in a ball mill with ceramic balls for 48 hours.

Figure 2:
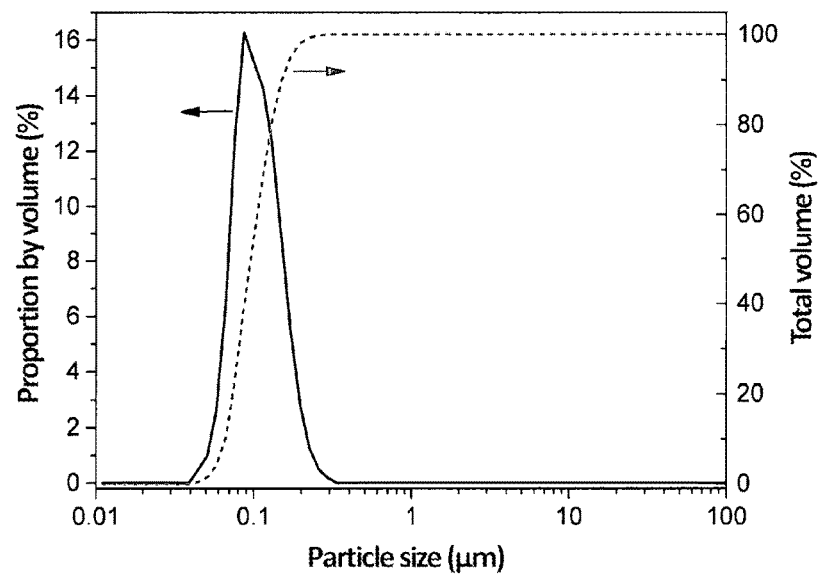
FIG. 2: Particle size distribution for $Li_{1.5}Al_{0.5}Ti_{1.5}(PO_4)_3$ powder pre-sintered at 600° C. following a milling step in a ball mill, as described in the text.

FIG. 2 shows the particle size distribution of this milled powder. The powder has an almost perfect particle size distribution with $d_{90} < 0.15$ μm, $d_{50} < 0.097$ μm and $d_{10} < 0.066$ μm.

Embodiment 2: Preparing Dense $Li_{1.5}Al_{0.5}Ti_{1.5}(PO_4)_3$ Pellets 1 g of the pre-sintered powder from Embodiment 1 was added to a cylindrical compression sleeve having a diameter of 13 mm and compacted under uniaxial pressure of 100 MPa at room temperature. The resulting pellets were sintered for 5 hours at 880° C. The pressure merely relates to the process of pressing the powder for shaping purposes; no pressure is applied during sintering.

Figure 3:
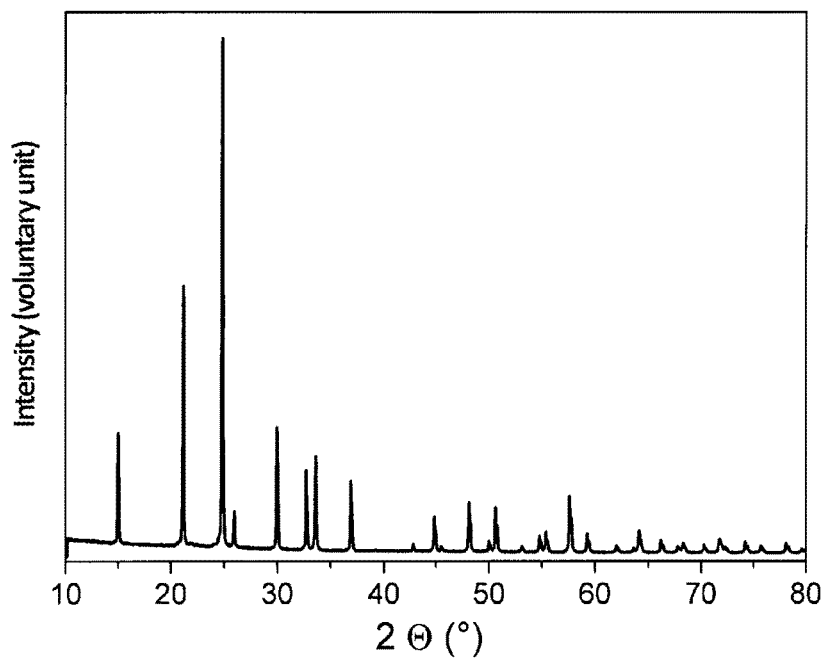
FIG. 3: X-ray diffractogram for the $Li_{1.5}Al_{0.5}Ti_{1.5}(PO_4)_3$ powder prepared according to the invention after the compaction step.

After sintering, the resulting pellets are pure white and have a density in excess of 99% of the theoretical density. The diffractogram for these pellets, which was recorded using a Siemens D4 X-ray diffractometer using the Cu $K_\alpha$ wavelength, does not show any foreign phases within the sintered specimens, as can be seen in FIG. 3.

Embodiment 3: Conductivity Measurements on the $Li_{1.5}Al_{0.5}Ti_{1.5}(PO_4)_3$ Pellets The dense $Li_{1.5}Al_{0.5}Ti_{1.5}(PO_4)_3$ pellets from Embodiment 2 were vapor-plated with gold on both sides. The dielectric properties of the pellets were recorded at temperatures of between −30° C. and +40° C. using a commercial frequency response analyzer (Biologic VMP-300) with an AC frequency range from 1 MHz to 1 Hz. The corresponding impedance spectrum for the measurement performed at 20° C. is illustrated in FIG. 4.

Figure 5:
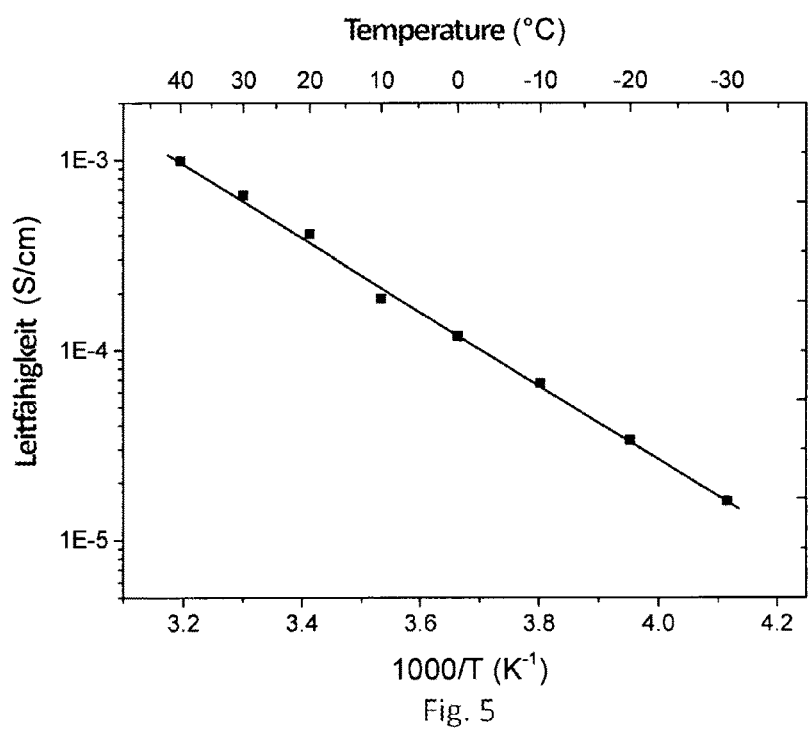
FIG. 5: Temperature dependence of the ion conductivity of the $Li_{1.5}Al_{0.5}Ti_{1.5}(PO_4)_3$ compacted product (pellet) sintered and prepared according to the invention.

An overall conductivity of $4 \times 10^{-4}$ S/cm at 20° C. was obtained for these dense $Li_{1.5}Al_{0.5}Ti_{1.5}(PO_4)_3$ pellets, as prepared according to Embodiment 2. Also see FIG. 5.

Embodiment 4: Preparing 20 G of $Li_2Sc_{0.5}Ti_{1.5}(Po_4)_{2.5}(SiO_4)_{0.5}$ Powder In order to prepare $Li_2Sc_{0.5}Ti_{1.5}(PO_4)_{2.5}(SiO_4)_{0.5}$ powder, 21.77 g of titanium isopropoxide was slowly added to a beaker containing 100 ml deionized water while stirring. Titanium hydroxide oxide precipitates formed instantaneously. The precipitates were carefully filtered and washed. The washed precipitates were transferred to another empty beaker and topped up with 60 ml deionized water. The beaker containing the aqueous precipitate solution was cooled in an ice bath comprising a mixture of ice and water to temperatures of less than 5° C., stirring constantly.

14 ml nitric acid (65% by weight) was also cooled to temperatures of less than 5° C. in another beaker in a refrigerator. The cooled nitric acid was slowly added to the existing cooled solution containing the titanium hydroxide oxide precipitates. The heat that is generally produced during this reaction was dissipated via the ice bath. The speed at which the nitric acid was added was gauged such that the temperature of the solution containing the titanium hydroxide oxide precipitates did not exceed 10° C. The resulting aqueous system was stored in a refrigerator at 0° C. for three days. The aqueous $TiO^{2+}$ nitrate solution formed during this period. The solution was stabilized by adding 35 g citric acid monohydrate.

1.685 g $Sc_2O_3$ was weighed out and dissolved in 20 ml 5 M nitric acid. This solution was added to the solution containing titanium while stirring together with 7.043 g $LiNO_3$.

5.320 g tetraethyl orthosilicate was mixed with 25 ml 5 M nitric acid and the resulting sol was mixed with the above-mentioned titanium solution containing the Sc and Li ions. The sol was cooled in an ice bath to temperatures of less than 5° C.

14.69 g $NH_4H_2PO_4$ was then also added. The mixture was stirred for a further 30 minutes. The sol was then slowly heated to room temperature. After approximately 30 minutes, the process of continuous transformation to a gel was complete.

The resulting gel was initially pre-dried for 12 hours at 60° C. and then for a further 24 hours at 120° C. The dried gel was pre-sintered for 3 hours at 600° C. This resulted in a whitish grey powder. The powder comprising $Li_2Sc_{0.5}Ti_{1.5}(PO_4)_{2.5}(SiO_4)_{0.5}$ was milled in a ball mill with ceramic balls for 48 hours and could be compacted to form dense pellets as described for Embodiment 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for preparing a lithium titanium phosphate having a general composition $Li_{1+x+y}M_xTi_{2-x}(PO_4)_{3-y}(SiO_4)_y$, wherein M=Al, Ga, In, Sc, V, Cr, Mn, Co, Fe, Y, La, Ce, Pr, Nd, Pm, Sm, Eu, Gd, Tb, Dy, Ho, Er, Tm, Yb, or Lu, wherein $0<x<0.5$, wherein $0<y<0.5$, and wherein a sol-gel process is used to prepare the phosphate, the method comprising:
producing a sol from source materials, wherein the producing the sol from the source materials comprises:
adding titanium(IV) isopropoxide to water to produce precipitates of titanium hydroxide oxide,
cooling a system of the precipitates down to a temperature of less than 10° C., and
redissolving the precipitates by adding nitric acid to form an aqueous $TiO^{2+}$ nitrate solution;
converting the sol to a gel; and
drying the gel to obtain a corresponding powder comprising the lithium titanium phosphate.

2. The method according to claim 1, wherein a polycarboxylic acid is added to the aqueous $TiO^{2+}$ nitrate solution resulting in the formation of a stable aqueous $TiO^{2+}$ nitrate solution even at room temperature.

3. The method according to claim 1, wherein at least one of citric acid, fumaric acid, or tartaric acid is added to the aqueous $TiO^{2+}$ nitrate solution.

4. The method according to claim 1, wherein an aqueous solution of at least one of lithium salts and M salts is provided, wherein M=Al, Ga, In, Sc, V, Cr, Mn, Co, Fe, Y, La, Ce, Pr, Nd, Pm, Sm, Eu, Gd, Tb, Dy, Ho, Er, Tm, Yb, or Lu,
wherein an aqueous solution of Li and M salts is mixed with the aqueous $TiO^{2+}$ nitrate solution, and
wherein the aqueous mixture of Li and M salts and the aqueous $TiO^{2+}$ nitrate solution is cooled down to temperatures of less than 10° C. before adding a phosphate salt, resulting in the formation of the sol.

5. The method according to claim 1, wherein lithium is used in a form of lithium nitrate, lithium acetate, lithium carbonate, or lithium hydroxide.

6. The method according to claim 1, wherein the M salts are used in a form of nitrates, acetates, carbonates, or hydroxides.

7. The method according to claim 1, wherein phosphoric acid and/or $NH_4H_2PO_4$ is added as a phosphate salt.

8. The method according to claim 7, wherein a soluble silicate, an orthosilicic acid, or an alkyl ester of the orthosilicic acid is added to the aqueous solution before adding the phosphate salt.

9. The method according to claim 1, wherein the sol is converted continuously to a gel by heating the sol to room temperature.

10. The method according to claim 1, wherein the lithium titanium phosphate is compacted at room temperature at pressures of between 50 and 200 MPa and then sintered without pressure at temperatures of between 820 and 1050° C.

11. A lithium titanium phosphate having a general composition $Li_{1+x+y}M_xTi_{2-x}(PO_4)_{3-y}(SiO_4)_y$, wherein M=Al, Ga, In, Sc, V, Cr, Mn, Co, Fe, Y, La, Ce, Pr, Nd, Pm, Sm, Eu, Gd, Tb, Dy, Ho, Er, Tm, Yb, or Lu, wherein $0<x<0.5$, wherein $0<y<0.5$, the lithium titanium phosphate being phase-pure and prepared using the method according to claim 1.

12. The lithium titanium phosphate according to claim 11, wherein the lithium titanium phosphate has a density of more than 99% of a theoretical density.

13. A solid-state electrolyte for use in a lithium battery or an Li/air battery, the solid-state electrolyte comprising:
a lithium titanium phosphate with a general composition $Li_{1+x+y}M_xTi_{2-x}(PO_4)_{3-y}(SiO_4)_y$, wherein M=Al, Ga, In, Sc, V, Cr, Mn, Co, Fe, Y, La, Ce, Pr, Nd, Pm, Sm, Eu, Gd, Tb, Dy, Ho, Er, Tm, Yb, or Lu, wherein $0<x<0.5$ and $0<y<0.5$, the lithium titanium phosphate being phase pure and prepared according to claim 1.

14. The solid-state electrolyte according to claim 13, wherein the solid state electrolyte comprises $Li_{1.5}Al_{0.5}Ti_{1.5}(PO_4)_3$, $Li_{1.4}Y_{0.4}Ti_{1.6}(PO_4)_3$, $Li_{1.3}La_{0.3}Ti_{1.7}(PO_4)_3$, $Li_2Sc_{0.5}Ti_{1.5}(PO_4)_{2.5}(SiO_4)_{0.5}$, or $Li_{1.8}Al_{0.4}Ti_{1.6}(PO_4)_{2.6}(SiO_4)_{0.4}$.

\* \* \* \* \*